United States Patent [19]
Linam

[11] 3,852,562
[45] Dec. 3, 1974

[54] WELDING CRATER FILL MECHANISM

[75] Inventor: Richard L. Linam, League City, Tex.

[73] Assignee: Kelso Marine, Inc., Galveston, Tex.

[22] Filed: May 22, 1973

[21] Appl. No.: 362,779

[52] U.S. Cl. .............................. 219/125 R, 219/124
[51] Int. Cl. .............................................. B23k 9/12
[58] Field of Search ........... 219/124, 125 R, 125 PL

[56] References Cited
UNITED STATES PATENTS

| | | | |
|---|---|---|---|
| 3,119,009 | 1/1964 | Zeller............................. | 219/125 R |
| 3,154,665 | 10/1964 | Dunning et al. .................... | 219/124 |

*Primary Examiner*—C. L. Albritton
*Attorney, Agent, or Firm*—Jack W. Hayden

[57] ABSTRACT

A welding crater fill mechanism is provided with means for positioning welding guns in position for welding between weldment component moving relative to the welding guns, and means to determine the length of the weld between the weldment components so that when such length of weld has been completed, additional means move the welding guns so that the welding guns overlap at least a portion of the weld. Additional means are provided for accommodating movement of the welding guns horizontally and toward and away from the weldment components as well as means to actuate such movement and means are provided for turning the welding guns on to initiate the welding and to stop the welding. The mechanism includes an arrangement so that after the overlap has been completed the welding guns are withdrawn from the weldments as the welding guns are turned off; similarly, the welding guns are initially positioned adjacent the weldment components prior to turning the welding gun on.

15 Claims, 4 Drawing Figures

WELDING CRATER FILL MECHANISM

CROSS REFERENCE TO RELATED APPLICATION

The present invention may be employed with the apparatus of copending application of applicant bearing Ser. No. 362,780, filed in the U.S. Pat. Office on May 22, 1973 for "Apparatus For Controlling The Welding Pattern Between Weldment Components" and is assigned to the assignee of this invention.

Applicant is not personally familiar with any prior art that discloses a mechanical concept of providing an arrangement for filling a void or crater when a welding arc is abruptly terminated. Electronic control devices are available which attempt to eliminate the crater by varying the arc voltage and/or current; however, these devices are not very effective.

Thus, the present invention is directed to a welding crater fill mechanism for use with welding guns which are welding on weldment components moving relative to the welding guns so that the crater at the end of the weld between the weldment components may be overlapped and filled.

Another object of the present invention is to provide a welding crater fill mechanism for use with welding guns which are welding on weldment components moving relative to the welding guns so as to fill the crater at the end of the weld to inhibit stress concentration points or weaknesses in the weld between the weldment components.

Another object of the present invention is to provide a predetermined manner of movement of welding guns to first position the guns relative to weldment components for welding thereof, and means to effect movement of the welding guns at the termination of the weld so that the welding guns overlap at least a portion of the weld.

Another object of the present invention is to provide a predetermined manner of movement of welding guns to first position them relative to weldment components for welding thereof, and means to effect movement of the welding guns at the termination of the weld so that the welding guns overlap at least a portion of the weld, and additional means to effect movement of the welding guns away from the weldment components after the overlay is completed before the welding guns are shut off.

Other objects and advantages of the present invention will become more readily apparent from consideration of the following drawings and description.

DESCRIPTION OF THE PREFERRED EMBODIMENT

Figure 3:
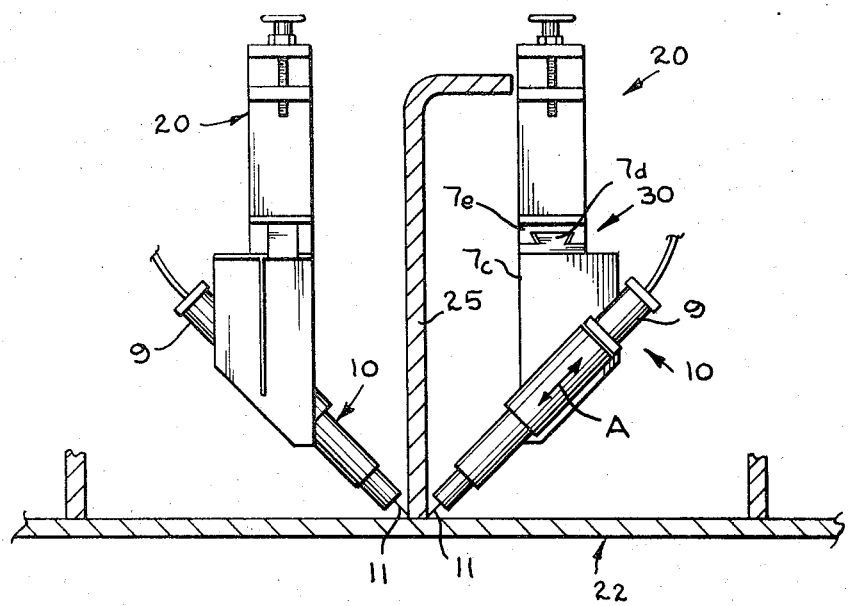
FIG. 3 illustrates a pair of welding guns positioned for forming a weld between weldment components and means to accommodate horizontal and vertical movement of the welding guns and means to effect movement of the welding guns toward and away from the weldment components.

Attention is first directed to FIG. 3 of the drawings wherein welding guns are referred to generally by the numeral 10 and are shown as being carried by suitable support means referred to generally at 20. The guns 10 are shown positioned in FIG. 3 so that the welding rod 11 of each gun is properly positioned for forming a weld on the weldment components referred to at 22 and 25 respectivly.

The support 20 includes suitable means referred to generally at 30 in FIG. 3 for accommodating relative horizontal movement between the guns 10 and the support means 20. Means 35, better seen in FIG. 4 accommodate movement of the guns toward and away from the weldment components.

In FIG. 3 cylinder means referred to at 9 effect movement of the welding guns 10 toward and away from the weldment components 22 and 25 to properly position the welding rod 11 for welding between the weldment components, as will be described in greater detail.

Figure 4:
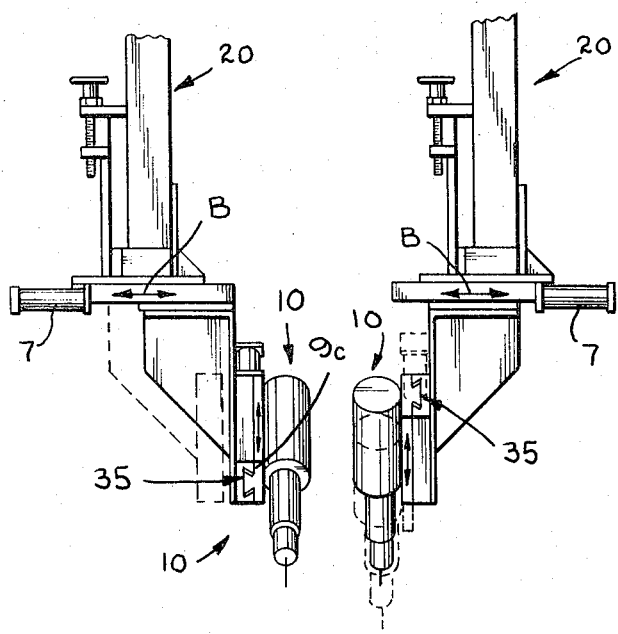
FIG. 4 is a side view of FIG. 3 showing the means to effect horizontal movement of the welding guns and means to accommodate movement of the welding guns horizontally and towards and away from the weldment components.

In FIG. 4 the support means 20 is again illustrated and cylinder means 7 are shown as being provided to effect horizontal movement of the guns 10 along the means 30 referred to in FIG. 3, as will be described in greater detail.

Movement toward and away from the weldment components by the welding gun 10 is illustrated by the arrow A in FIG. 3 and the horizontal movement of the welding guns 10 is referred to by the letter B in FIG. 4.

Figures 1, 2:
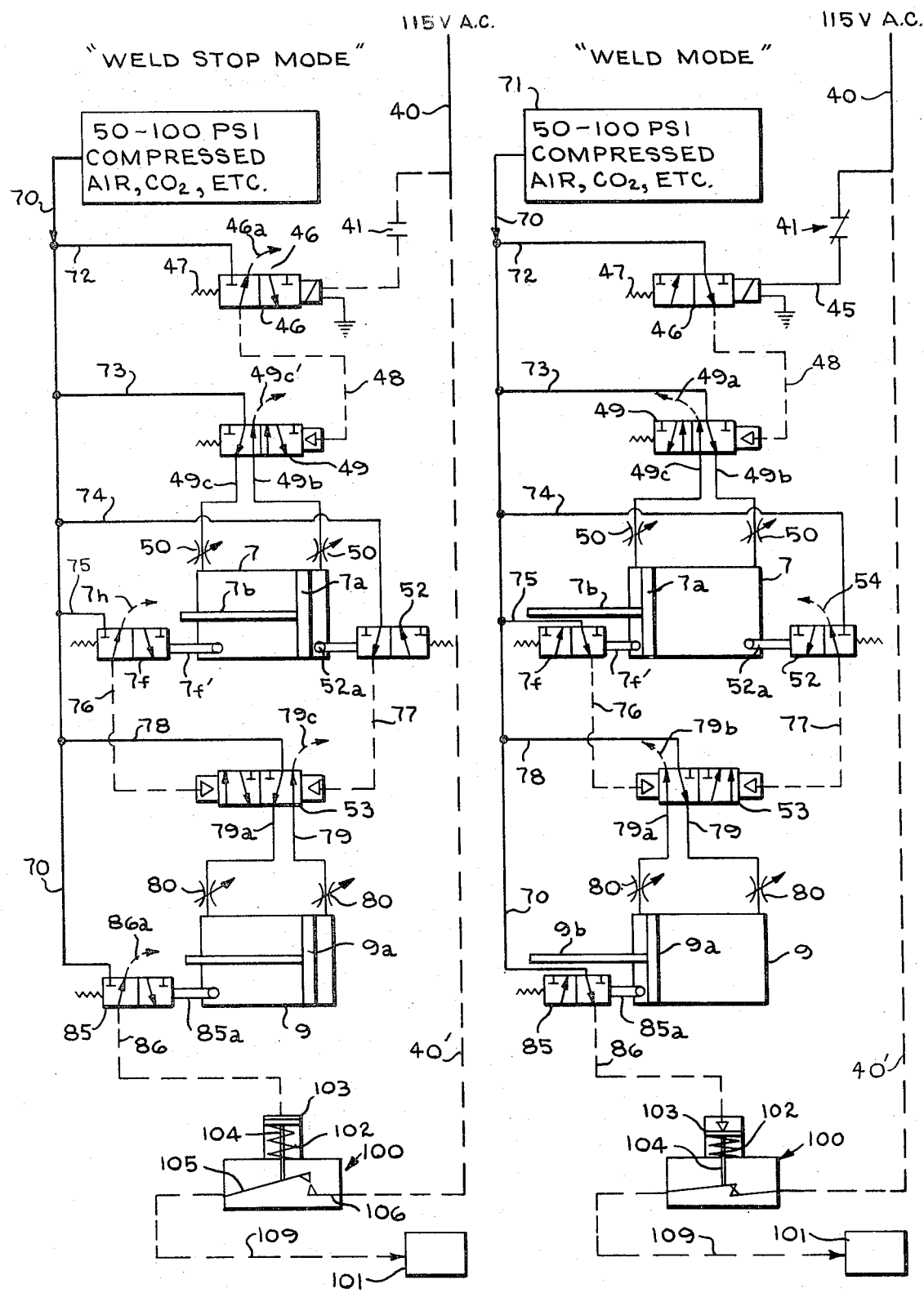
FIG. 1 is a schematic of the electro-pneumatic and mechanical arrangement of the preferred embodiment of the present invention when the apparatus is in the weld mode relationship for welding between weldment components.
FIG. 2 is an electro-pneumatic and mechanical schematic similar to FIG. 1 but showing the relative position of the components when the welding gun is shut off.

The operation of the present invention may be better understood by referring to FIGS. 1 and 2. A source of power such as an electrical source supplies current through the electrical conduit 40 to the switch 41 and by means of the conduit 40' to the spring actuated switch 100. The switch 41 may be controlled by the apparatus disclosed and claimed in application Ser. No. 362,780 hereinabove referred to, and/or it may be manually actuated at a control panel. When the switch 41 is closed as shown in FIG. 1, electric power is supplied through the conduit 45 to the solenoid valve 46. The solenoid valve 46 is spring loaded as schematically illustrated at 47 so that it is normally closed, and electric current in conduit 45 energizes the solenoid to move the valve, to the position shown in FIG. 1.

The conduit 70 is connected to a source of compressed fluid medium 71 and when the solenoid valve 46 is opened as shown in FIG. 1, such compressed fluid medium passes through the branch conduit 72 and through the valve 46 and conduit 48 so that such compressed fluid medium acts on the spring loaded valve 49 to move it to the position shown in FIG. 1. When this occurs compressed fluid medium flows through the branch conduit 73 through the spring loaded valve 49 and through the conduit 49b through the metering valve 50 to the cylinder 7 illustrated in FIG. 4 of the drawings.

The cylinder 7 includes a piston 7a connected with a piston rod 7b and the piston rod 7b is in turn connected with the portion 7c of the support means 20 as shown in FIG. 3. The upper end of the portion 7c includes a male projection in the form of a dovetail 7d which interfits with the female mating portion 7e which forms the means 30 to accommodate horizontal movement of the welding guns 10. When the piston 7a has been moved to the left as illustrated in FIG. 1 of the drawings by the pressure fluid from conduit 49b passing into cylinder 7, it contacts the projection 7f' of spring loaded valve 7f, which is built into the cylinder 7 in a manner well known in the art. The spring loaded valve 7f is normally closed and when 7f' is engaged by the piston 7a the valve 7f is moved to the position shown in FIG. 1, fluid pressure from the branch conduit 75 passes through valve 7f and through the conduit 76.

It should be noted that prior to the time that the piston 7a is moved from the position shown in FIG. 2 to the position shown in FIG. 1 fluid pressure is applied through the conduit 74 and passes through the spring load valve 52 in cylinder 7 and through the conduit 77 to act on the spool valve 53 to move it to the position shown in FIG. 2 of the drawing. However, when fluid pressure from conduit 49b enters cylinder 7 as shown in FIG. 1 to move the piston 7a to the left as viewed in FIG. 1 the source of fluid pressure through conduit 74 is cut off and the spring loaded valve 52, which is mounted in the cylinder 7 in a manner well known in the art, is urged to the left as viewed in FIG. 1 so that conduit 77 is vented to atmosphere as represented at 54 in FIG. 1.

Similarly, it should be noted that as the piston 7a moves to the left, as viewed in FIG. 1 the cylinder 7 at one end is vented to atmosphere through conduit 49c which communicates through passage means in spring loaded valve 49 to be discharged or vented to atmosphere as represented at 49a.

When the pressure fluid from conduit 76 acts on spool valve 53 to move it to the position shown in FIG. 1 of the drawings, pressure fluid then passes from branch conduit 78 through spool valve 53 as indicated in FIG. 1 and through conduit 79 and through metering valve 80 into cylinder 9. When this occurs piston 9a in the cylinder is urged to the left as viewed in FIG. 1 and conduit 79a discharges or vents one side of the cylinder 9 through spool valve 53 to atmosphere as represented by the arrow at 79b. It will be noted that conduits 49b and 49c from cylinder 7 and conduits 79 and 79a are both provided with metering valves 50 and 80 respectively for purposes that will be described hereinafter.

Piston 9a is connected to piston rod 9b and piston rod 9b is in turn connected to the portion 9c of the support 20. The portion 9c is the male part of the dovetail connection shown in FIG. 4 which interfits with a similarly configured female portion to form the means 35 to accommodate movement of the welding guns 10 toward and away from the weldment components. Thus, it can be seen from the foregoing description that means are provided to first position the welding guns and the welding rods 11 carried thereby relative to the weldments 22 and 25 before fluid pressure is passed from the conduit 70 through the valve 85 and conduit 86 to act on the spring loaded switch 100 and close such switch so that the welder controls, referred to generally at 101, are actuated to ignite the welding guns.

It can be appreciated that the welding guns 10 and support means 20 may be mounted in any suitable fashion to move relative to the weldments 22 and 25, but preferrably the weldments 22 and 25 are moved relative to the welding guns 10 such as for example as described in U.S. Letters Pat. No. 3,650,457.

The switch means 41 determines the length of the weld between weldments 22 and 25 and when switch 41 is either manually opened, or opened as described in copending application Ser. No. 362,780 filed on May 22, 1973 hereinbefore referred to, solenoid valve 46 is deactivated and spring 47 moves it to the position shown in FIG. 2 of the drawings. When this occurs the valve 46 is closed and conduit 48 from four-way spring loaded valve 49 is vented to atmosphere through valve 46 as represented at 46a. Similarly the supply from branch conduit 72 is cut off as shown in FIG. 2 and spring loaded valve 49 moves to the position shown in FIG. 2 of the drawings whereupon the pressure in branch 73 passes through such spring loaded valve and conduit 49c metering valve 50 therein to act on piston 7a to move it to the right as shown in FIG. 2.

When valve 49 is moved to the right as viewed in FIG. 2 of the drawings, the righthand end of cylinder 7 is vented to atmosphere through the metering valve 50 conduit 49b and through valve 49 to atmosphere as indicated at 49c' in FIG. 2.

As soon as piston 7a moves away from engagement with spring loaded valve 7f arranged in the cylinder in a manner well known in the art, the spring moves such valve 7f whereupon conduit 76 is vented to atmosphere through valve 7f as represented at 7h and the supply from branch conduit 75 is cut off as shown in FIG. 2.

When piston 7a moves to the right it contacts projection 52a and actuates spring loaded valve 52 to move it to the position shown in FIG. 2 of the drawings whereon pressure fluid from branch conduit 74 is communicated through conduit 77 to act, to move spool valve 53 to the left as viewed in FIG. 2 whereupon fluid pressure then communicates through from branch conduit 78 such spool valve 53 then through conduit 79a to metering valve 80 and then into cylinder 9 to act on piston 9a to move it to the right as viewed in FIG. 2 of the drawings. When this occurs spring loaded valve 85 moves as viewed in FIG. 2 so that conduit 86 may be vented to atmosphere through such valve 85 as represented at 86a. Flow from conduit 70 is also shut off, whereupon spring 102 in switch 100 acts on piston 103 therein to move it upwardly and piston 103 includes a piston rod 104 connected with the switch portion 105 which is pivotally mounted in the switch 100 to disengage from the switch portion 106 and thereby break the supply of power, or cut off the supply of power from electrical conduit 40' which actuates the welding controls 101. This then shuts off the welding guns 10.

From the above description, it can be appreciated that power is supplied through the electrical conduit 40' to actuate the welding controls 101 even though piston 7a reverses at the end of the weld when switch 41 is opened to move the welding guns 10 horizontally.

Thus, when the switch 41 is opened, the weld is abruptly terminated, but the welding guns 10 remain ignited and thus the welding guns 10 by reason of their connection through the piston rod 7b and the means 30 which accommodate horizontal movement, overlap the termination of the weld so as to fill any crater or void that may be present by reason of abruptly terminating the travel of the welding guns 10.

In other words, when switch 41 is opened, this causes the welding guns 10 to travel in the same direction as the weldment components are moving and the metering valves 50 can be adjusted to adjust the speed of travel of the piston 7a in cylinder 7 and determine the amount of overlap at the end of the weldment. For example, if the metering valve 50 is adjusted so that the piston moves to the right in FIG. 2 at twice the velocity of the weldment components and if the travel or strike of the piston 7a is 2 inches, then there would be an overlap of 1 inch at the end of each weld.

After the overlap has been completed, and the piston 7a and welding gun moved to overlap as much of the weldment as desired, then the valve 52 is actuated which in turn causes pressurized fluid to pass through branch conduit 74 and conduit 77 to position valve 53 so that fluid pressure from conduit 78 may act through conduit 79a and move piston 9a to the right in cylinder 9 as described in FIG. 2. This causes the welding guns 10 to move away from the weldment and as soon as the welding guns 10 have moved away from the weldment and as soon as piston 9a has disengaged from projection 85a of valve 85 then the switch 100 is deactivated and opened to cut off the welding guns.

The foregoing disclosure and description of the invention are illustrative and explanatory thereof, and various changes in the size, shape, and materials as well as in the details of the illustrated construction may be made without departing from the spirit of the invention.

What is claimed is:

1. A welding crater fill mechanism for use with a welding gun on weldment components moving relative to the welding gun comprising:
   a. support means for supporting the welding gun;
   b. means on said support means to accommodate movement of the welding gun into position for welding the weldment components;
   c. means to determine the length of the weld between the weldment components; and
   d. means to effect movement of the welding gun at the termination of the weld length so that the welding gun overlaps at least a portion of the weld.

2. The invention of claim 1 wherein said means to accommodate movement include means for accommodating movement of the welding gun horizontally and means to accommodate non-rotatable movement of the welding gun toward and away from the weldment components.

3. The invention of claim 1 including means to predetermine the amount of overlap on the weld by the welding gun.

4. The invention of claim 2 including means to actuate movement of the welding gun horizontally and means to actuate non-rotatable movement of the welding gun toward and away from the weldment components.

5. The invention of claim 3 including means to actuate movement of the welding gun away from the weld after the overlay is completed.

6. A welding crater fill mechanism for use with a welding gun on weldment components moving relative to the welding gun comprising:
   a. support means for supporting the welding gun;
   b. means on said support means to move the welding gun into position for welding the weldment components;
   c. switch means to turn on the welding gun for welding the weldment components when the gun is positioned;
   d. means to determine the length of the weld between the weldment components;
   e. means to effect movement of the welding gun at the termination of the weld length so that the welding gun overlaps at least a portion of the weld; and
   f. switch means to shut off the welding gun after the overlap is completed.

7. The invention of claim 6 wherein said means to accommodate movement include means for accommodating movement of the welding gun horizontally and means to accommodate non-rotatable movement of the welding gun toward and away from the weldment components.

8. The invention of claim 6 including means to predetermine the amount of overlap on the weld by the welding gun.

9. The invention of claim 6 including means to actuate movement of the welding gun horizontally and means to actuate non-rotatable movement of the welding gun toward and away from the weldment components.

10. The invention of claim 6 including means to first actuate movement of the welding gun away from the weld after the overlay is completed prior to shutting off the welding gun by said switch means.

11. A welding crater fill mechanism for use with a welding gun on weldment components moving relative to the welding gun comprising:
    a. a power source;
    b. switch means to turn off and on said power source;
    c. support means for supporting the welding gun;
    d. means on said support means to accommodate movement of the welding gun into position for welding the weldment components when said power source is on;
    e. switch means to turn on the welding gun for welding the weldment components when the gun is positioned;
    f. switch means to determine the length of the weld between the weldment components;
    g. means to effect movement of the welding gun at the termination of the weld length so that the welding gun overlaps at least a portion of the weld when said power source is off; and
    h. switch means to shut off the welding gun after the overlap is completed.

12. The invention of claim 11 including means to predetermine the amount of overlap on the weld by the welding gun.

13. The invention of claim 11 including means to actuate movement of the welding gun horizontally and means to actuate non-rotatable movement of the welding gun toward and away from the weldment components.

14. The invention of claim 11 including means to actuate movement of the welding gun away from the weld after the overlay is completed.

15. The invention of claim 11 including means to first actuate movement of the welding gun away from the weld after the overlay is completed prior to shutting off the welding gun by said switch means.

* * * * *